J. NORTH.
SAW SET.
APPLICATION FILED JUNE 19, 1913.
1,188,307.
Patented June 20, 1916.
2 SHEETS—SHEET 1.
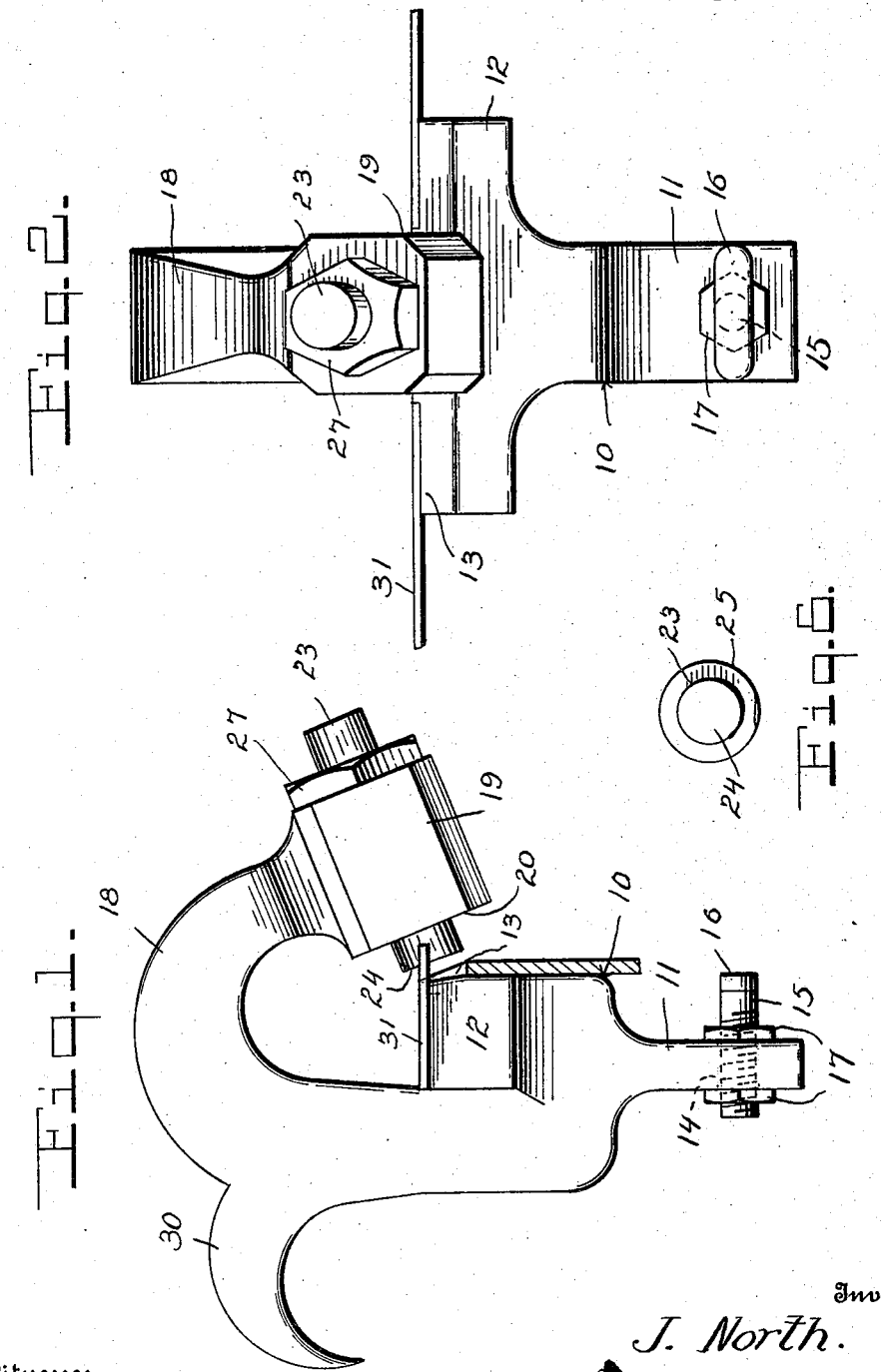
Witnesses
R. N. Jones.
R. M. Smith.
Inventor
J. North.
By  T. Randolph Jr.
Attorney.

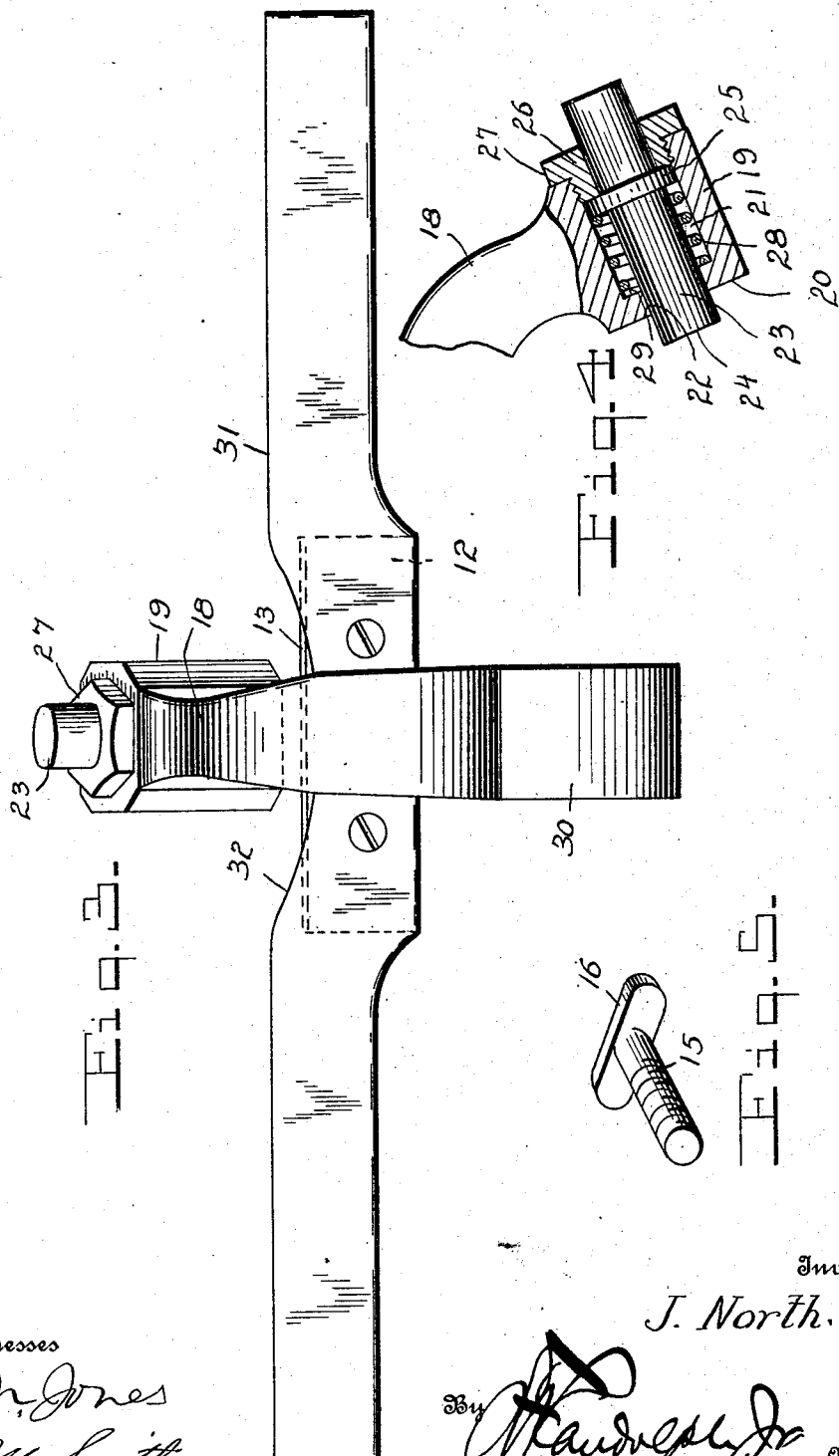

UNITED STATES PATENT OFFICE.

JAMES NORTH, OF HAMILTON, WASHINGTON.

SAW-SET.

1,188,307.  Specification of Letters Patent.  Patented June 20, 1916.

Application filed June 19, 1913. Serial No. 774,651.

*To all whom it may concern:*

Be it known that I, JAMES NORTH, a citizen of the United States, residing at Hamilton, in the county of Skagit and State of Washington, have invented certain new and useful Improvements in Saw-Sets; and I do hereby declare the following to be a full, clear, and exact description of the invention, such as will enable others skilled in the art to which it appertains to make and use the same.

This invention comprehends improvements in saw setting devices and relates more particularly to those of the anvil type which are adapted to be held in the hand of the operator.

One of the objects of the invention resides in the provision of a saw set of this nature which will be of strong and simple construction, efficient in operation, and practical for use in setting the teeth of crosscut and circular saws.

As a further object, the invention contemplates the provision of a novel saw set including a body having a head or anvil provided with a beveled portion against which the teeth of a saw may be forced, an arched arm extending from the rear of the body upwardly over the top of the anvil, and carrying on its extremity a reciprocatory punch.

With these and other objects in view, as will become more apparent as the description proceeds, the invention consists in certain novel features of construction, combination, and arrangement of parts, as will be hereinafter described and claimed.

For a complete understanding of my invention, reference is to be had to the following description and accompanying drawings, in which, Figure 1 is a side elevation of my improved saw set, showing a saw in position, Fig. 2 is a front elevation with the ends of the guard plate broken away, Fig. 3 is a top plan view, Fig. 4 is a fragmentary detail sectional view, partly in elevation, through the extremity of the punch carrying arm, showing the punch, Fig. 5 is a detail perspective view of the gage bolt, and, Fig. 6 is a plan view of the punch.

In the preferred embodiment of my invention, I provide an anvil having a body, generally designated 10, which appears T-shaped when viewed from the front side and which consists of a shank 11 and head 12, the latter forming an anvil having its front face beveled adjacent its upper edge, as indicated by the numeral 13. The shank 11 is of a reduced thickness, as clearly shown in Fig. 1, and is formed with a transverse threaded opening 14, through which a threaded gage bolt 15 having an elongated head 16, slides. Jam nuts 17 are carried by the gage bolt so as to hold the same in any desired position.

An arched arm 18 extends upwardly from the top of the body to the rear of the anvil 12 and crosses some distance above the latter and is then extended downwardly. A casing or housing 19 is formed upon the free extremity of the arm 18 and has its inner end 20 disposed so as to be parallel to the beveled outer face of a saw tooth that has been set, as will be apparent upon reference to Fig. 1.

The casing is provided with an annular chamber 21 extending entirely therethrough and being of a reduced diameter adjacent its inner end, as indicated at 22. A cylindrical punch 23 extends through the chamber 21 and has its inner extremity 24 disposed so as to be parallel to the beveled outer face of a saw tooth when the latter has been set. The punch is formed intermediate its ends with a flange or collar 25, which is fitted within the chamber 21 and which is prevented from outward movement beyond a certain distance by the sleeve nut 26 which is threaded within the chamber 21 and which is provided with a head 27 which bears against the outer end of the casing 19. An expansive spiral spring 28 surrounds the punch 23 and by bearing against the shoulder 29 and collar 25, holds the punch normally in its outermost position, at which time its inner end is disposed in spaced relation to the beveled face 13. A horn 30 extends laterally from the vertical portion of the arm 18 and acts as a handle so that the device may be easily supported. The body 10, arm 18, casing 19, and horn or handle 30 are preferably cast integrally.

A guard plate 31 is secured to the top of the anvil and extends a considerable distance beyond each end thereof. The plate is disposed longitudinally of the anvil, extends forwardly beyond the front face thereof, and is cut away centrally of its ends to provide the recess 32. This recess does not extend to the ends of the anvil and is for the purpose of permitting the punch being driven against the teeth of the saw, In use the set is held so that the front side of the body and the head 16 of the gage bolt bear against one side of the saw so that the teeth of the saw engage the under side of the guard plate 31. The angle between the body and saw may be varied by an adjustment of the gage bolt so that the teeth may be set at any desired degree. With the set held in the left hand the operator reaches across the saw with his right hand and directs the punch with any suitable object so as to drive the former toward the beveled face 13 and bend one of the saw teeth. The plate 31 prevents the arm of the operator coming in contact with the teeth of the saw and also acts as a stop for the saw teeth.

From the foregoing description taken in connection with the accompanying drawings, it will be apparent that I have provided an extremely strong and simple saw set which may be easily held against a saw blade and operated so as to set the teeth thereon. The device is very compact, practical, and efficient, and the provision of the punch 23 provides a saw set much superior to those which provide no means for engaging the teeth and bending them.

It is to be understood that while I have shown and described the preferred embodiment of my invention, I do not wish to be limited to this exact construction, combination, and arrangement of parts, but may make such changes as will fall within the spirit and scope of the invention as claimed.

Having thus described my invention, I claim:—

A saw set structure, a body portion having elongated arms formed integrally therewith and extending transversely from each side of the same, a guard plate secured to the upper surface of each of said arms and projecting a relatively long distance on each side of the arms, said guard plates having an arcuate cut out portion formed in one edge of the same, the upper portion of the outer surface of said arms being beveled for forming an anvil face, the cutout portion of said guard plates being positioned directly above the anvil face of said arms, an arcuate arm formed integrally with said body portion and curving forwardly thereover, a head formed upon the terminal of said arcuate arm having its end positioned parallel with the anvil face of said arms, said head being provided with a recess extending longitudinally therein, said head provided with an opening extending therethrough which communicates with said recess, a setting pin positioned within said recess and projecting through said opening, a collar formed upon said setting pin, a coil spring coiled about said setting pin and positioned within said recess, a nut positioned within the open end of said recess and engaging said collar for preventing the accidental removal of setting pin from said head, a depending arm formed upon said body portion, and an adjustable gage bolt carried by said depending arm.

In testimony whereof I affix my signature in presence of two witnesses.

JAMES NORTH.

Witnesses:
S. H. SPRINKLE,
SAMUEL A. STAMM.